United States Patent
van der Wijngaart

(10) Patent No.: US 6,773,594 B1
(45) Date of Patent: Aug. 10, 2004

(54) WASTE-WATER PURIFICATION IN CATTLE-BREEDING SYSTEMS

(75) Inventor: Adriaan Johannes Hubertus van der Wijngaart, Kapelstraat 40, Prinsenbeek (NL), 4841 GJ

(73) Assignee: Adriaan Johannes Hubertus van der Wijngaart, Prinsenbeek (NL)

( * ) Notice: Subject to any disclaimer, the term of this patent is extended or adjusted under 35 U.S.C. 154(b) by 0 days.

(21) Appl. No.: 10/088,579

(22) PCT Filed: Sep. 20, 2000

(86) PCT No.: PCT/NL00/00669

§ 371 (c)(1),
(2), (4) Date: Aug. 5, 2002

(87) PCT Pub. No.: WO01/20976

PCT Pub. Date: Mar. 29, 2001

(30) Foreign Application Priority Data

Sep. 20, 1999 (NL) .............................. 1013097

(51) Int. Cl.⁷ .................................................. C02F 3/30
(52) U.S. Cl. ...................... 210/605; 210/622; 210/623; 210/195.2; 210/259; 435/262.5
(58) Field of Search ................................ 210/605, 609, 210/620, 621, 623, 626, 622, 195.2, 195.3, 252, 259; 435/262.5

(56) References Cited

U.S. PATENT DOCUMENTS

| 3,982,499 A | | 9/1976 | Frankl |
| 4,121,539 A | | 10/1978 | Moore |
| 4,749,494 A | | 6/1988 | Tomoyasu et al. |
| 5,401,400 A | * | 3/1995 | Tonelli et al. .............. 210/151 |
| 5,558,774 A | * | 9/1996 | Tonelli et al. .............. 210/612 |
| 5,833,856 A | | 11/1998 | Liu et al. |

FOREIGN PATENT DOCUMENTS

| DE | 3049302 | 8/1982 |
| EP | 0 498 084 A1 | 8/1992 |
| EP | 0 850 561 A1 | 7/1998 |
| NL | 8901220 | 12/1990 |
| NL | 9200763 | 11/1992 |

* cited by examiner

*Primary Examiner*—Fred G. Prince
(74) *Attorney, Agent, or Firm*—Merchant & Gould, P.C.

(57) ABSTRACT

The invention relates to an integrated stock farming system, comprising at least a stable for keeping cattle, wherein means are present for substantially preventing the formation of ammonia through contact of solid manure and urine by separation into a solid and a liquid phase, which system further comprises means for at least partly reprocessing the solid and/or the liquid phase into useful products.

23 Claims, 4 Drawing Sheets

WASTE-WATER PURIFICATION IN CATTLE-BREEDING SYSTEMS

Figure 1:
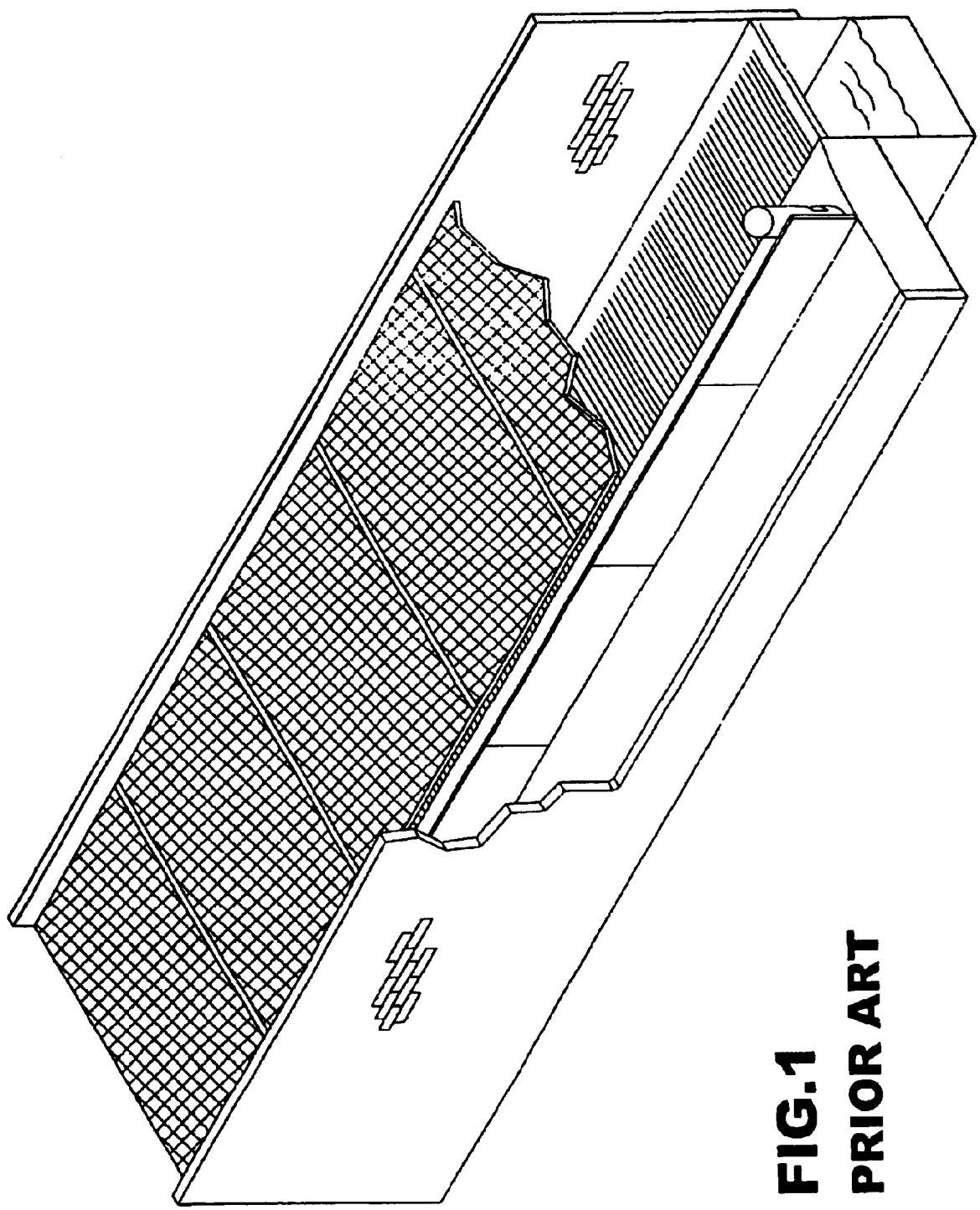

The present invention relates to a system of waste-water purification in cattle-breeding systems, more specifically in relation to manure processing, wherein the products to be produced from the manure are deployed as much as possible at the location where the residue is produced. This is mainly energy and water.

Domestic farming animals such as pigs, cows, horses, rabbits and furred animals produce urine and feces; chickens, by contrast, only produce solid manure.

Producing meat/eggs in the current production techniques has a great environmental impact when the discharge of residues from farming is involved. Air, soil and groundwater are subject to undue application of manure, so that the natural equilibrium is disturbed. In the current view, these residues are regarded as waste matter, but in the present invention, this waste is regarded as a raw material for a recycling process. The starting-point is that the waste is processed/treated so as to yield a product which, either at the farm direct, or indirectly, generates a surplus value for the producer of the waste. In the present invention, manure is regarded as "raw material" which, after being processed, yields an economic surplus value to the stock farms.

In intensive stock-farming, animals, such as cows, pigs, sheep, goats, chickens, furred animals, and the like, are housed on grids. The manure produced by the animals falls through the grid and is collected in a subjacent pit. The collected manure consists substantially of a combination of urine with solid manure. This mixture causes ammonia emission, both in the stable and when stored outside, which may lead to acidification. Also, it is undesirable for man and animals that in the housing/working space too high a concentration of ammonia gas is present. This may give rise to diseases of the lungs and liver and to reduced growth.

To obviate the problem, it is attempted to remove the manure mixture from the stable as fast as possible. This is done, for instance, by providing flushing drain/discharge drains, whereby any manure produced is discharged from the stable as fast as possible.

Another solution to this problem is found by keeping urine and feces separate on a conveyor belt. A belt arranged at a slant, or a spherically or semispherically shaped belt, causes the manure to run directly to the lowest point of discharge, either to a parallel discharge drain (drains) or along a drain integrally formed on the belt. The amazing attendant effect is that the enzymatic action is undone and through the absence of direct contact between manure and urine, no ammonia formation can arise.

Such a method already solves many problems, but what remains, obviously, is the necessity of the further processing of the residue streams, such as the solid manure constituents and the liquid manure constituents, but also the contaminated air from the stable. Further, there is an ongoing need for the furthest possible integration of the various processing systems.

Accordingly, the present invention concerns an integrated system for the purification of various residue streams of intensive stock farming, which are all grouped around the waste-water purification.

Accordingly, in a first embodiment, the invention provides a method for purifying waste water using microorganisms, preferably originating from an integrated stock farming system, which method comprises supplying waste water to a non-aerated section of a biological waste water purification plant, supplying the effluent of said non-aerated section to an aerated section, recirculating at least the greater part of the microorganisms and at least a part of the effluent of the aerated section to the aerated and/or the non-aerated section, and separating at least a part of the effluent using a membrane filtration.

In combination with this waste-water purification, an integrated system for a stable has been developed, which is based on the surprising insight that a far-reaching integration and compaction is possible.

If, accordingly, in the stable means are arranged that provide for, an immediate separation of urine and solid manure, it becomes possible to reuse the various product (waste) streams from the stable, without necessitating unduly dimensioned and complicated operations (purifications).

The invention now provides an integrated system for stock farming, in which the material streams, gas, solids, liquid, coming from the stable can be reused in a useful manner.

In the broadest embodiment, the invention concerns a method for purifying waste water using microorganisms, preferably originating from an integrated stock farming system, which method comprises supplying waste water to a non-aerated section of a biological waste water purification plant, supplying the effluent of said non-aerated section to an aerated section, recirculating at least the greater part of the microorganisms and at least a part of the effluent of the aerated section to the aerated and/or the non-aerated section, and separating at least a part of the microorganisms using a membrane filtration, the content of microorganisms in the waste-water purification being preferably above 10 g/l.

The liquid manure streams coming from the stable can, after adequate processing, be converted to products that are suitable for reuse in the system. To be considered in this connection is, inter alia, the purification of the liquid fraction in a biological manner in a high-loaded biological purification plant (biological oxidation, nitrification+ denitrification). This plant is preferably provided with means for separating the liquid from the biomass, for instance using membranes, rotor separator, sawdust filter, and the like. In any case, the plant is provided with a membrane filtration, with optionally a prior pre-purification, to relieve the membranes. Used as membranes are conventional systems, for instance based on round tubes or on flat membranes. In the case of round tubes, a pressure drop across the tubes of 2 to 10 bar is used, with a flow rate of 5 to 15 $m^3/h$, while flat membranes are preferably operated with a reduced pressure, the pressure on the clean water side being preferably between 0.25 and 0.75 bar.

In the biomembrane reactor, the liquid manure component can be processed, the stream being purified by consecutive denitrification and nitrification. This takes place in a reactor in which the content of microorganisms is maintained high (>10 $kg/m^3$ to 60 $kg/m^3$ or more) by the use of membranes or other techniques. Through the initial separation of the manure streams, an increased efficiency of such a biological purification of the liquid stream is obtained, which provides great advantages in the compactness of the plant and the operation thereof.

After the purification, the liquid is optionally post-purified through reverse osmosis, if desired after treatment in an algae or duckweed cultivation reactor, or in a reed field.

In the stable, preferably means are present for substantially preventing the formation of ammonia through contact of solid manure and urine, so that also at least a part of the heating requirement can be furnished by using heat coming from the stable in parts of the process. An additional advantage is that there is less ventilation needed, so that in cold periods there is less loss of heat.

The materials thereby obtained can be processed into composted or uncomposted solid manure, biomass, algae or duckweed, which can be combined with any additives in the desired ratio for furnishing an intermediate product for the manufacture of feed.

According to a preferred embodiment, a belt separator is placed under the stable, for instance a conveyor belt which separates the solid and liquid phases from each other. This separator can consist, for instance, of a belt arranged at a slant, having on the low side a discharge drain for the liquid, or a belt whose central axis is higher than the sides, with discharge drains on either side.

If placing belt separators is not possible, it may suffice to separate the manure as soon as it is present in the pits. These pits (or silos) can be arranged both inside and outside the stables. The collected manure is separated as fast as possible into a thin and a thick manure fraction. The separation can be carried out through administration of polyelectrolyte, or not, and subsequently presenting this mixture to a separator device. This device can be a centrifuge, a rotary separator, a screw jack press, a screening bend, a cyclone, or any other known technique of separating solid and liquid streams.

The objective then is for the separated water to achieve a solids percentage of about 1.5–2%, while the dry manure achieves a percentage of 25% by weight at a minimum. Obviously, deviations from this percentage are possible.

According to a preferred embodiment of the invention, a system for stock farming and manure reprocessing consists of a conventional stable or a modular stable, that is, an existing stable with a collecting provision and discharge for liquid and solid manure. The mixture of liquid and solid manure is conveyed out of the stable and separated in a centrifuge separator into a solid component and a liquid component. The latter component still contains a few percent of solids, which are separated in a settling provision, optionally after addition of coagulation auxiliaries. Thereafter the liquid is purified in a high-loaded nitrification/denitrification. The system of biomass and liquid circulates through a reaction system, while after the nitrification a part of the liquid is discharged via membranes. The remainder is recirculated to the reactor, for instance via sprinklers which also provide for the aeration.

The invention also relates to a combination of a stable provided with a manure separation as described above, in combination with a biomembrane reactor. The heat content of the water in the reactor is used for drying (a part of) the solid manure components by means of a conveyor pipe, with conveyor screw, which passes through the reactor. The heat of the water then provides for the drying.

After the reactor, a concentrated stream of biomass is obtained which is largely led back to the reactor, for maintaining the high load of biomass therein. Further, an effluent is obtained, which is already stripped to a reasonable extent of biomass and other contaminants. Next, after an optional reverse osmosis treatment, a purified effluent is obtained which contains substantially exclusively salt.

It is also possible to use the salt water for the breeding of mussels, oysters and other marine animals, since the content of salt and other minerals is such that the water is useful therefor. However, due account is to be taken of the toxicity of the manure component.

It is also possible to use the salt water as medium for absorbing moisture from air, provided that the salt composition and the content are sufficiently hygroscopic for that purpose. It may also be possible to sterilize the air from the stable through a treatment with the salt water. Excess salt water can optionally through electrolysis be converted into acids and bases, which, if desired, can be further utilized again in the system.

It is also of importance to operate any interposed aeration reactor in such a manner that not a complete degradation of the hydrocarbon and nitrogen compounds to $CO_2$ and $N_2$ occurs. It is noted in this connection that, incidentally, it is also possible to use a part of the heat originating from the stable partly as supply source.

In all these embodiments it may be desirable for the eventual liquid effluent, that is, after treatments in aeration reactor, algae cultivation reactor, duckweed cultivation reactor and/or with other nitrogen-fixing organisms, to be purified further to render it suitable for discharge into the sewer, or to make it suitable as rinsing water, drinking water, cultivation water, or irrigation water. To achieve this object, it may be desirable to install a post-connected water treatment system, by which the organic and inorganic components still present are further eliminated from the water to acceptable values. Suitable systems are, for instance, reverse osmosis, but also combinations of biological systems, such as an integrated waste-water purification plant or a reed field (heliophyte filter) and reverse osmosis systems are well deployable. The surprising effect is that due to the pre-connected biomembrane technique, the purification results are optimal, so that a compact post-purification becomes possible.

From the manure component which originates from the stable or from the separation plant, various valuable substances can be recovered. It is possible, for instance, through fermentation, to produce biogas which can supply a combined heating and power station. In this connection it is further noted that through the use of the starting-points of the present invention, for instance the separation of urine and solid manure at the source, but also when separated from the pit, the biogas plant has an increased efficiency, since the biogas formation proves to be inhibited through the formation of ammonia. Moreover, the solids content (of more than 10 to 60% dry matter or more) in the reactor can be considerably higher, which also has a positive effect on the operation and on the dimensioning thereof.

The present invention accordingly relates to a system consisting of a stable with a separation for solid and liquid manure components, while further a biogas plant for the fermentation of the solid manure components is present.

The resulting materials can optionally be combined for further processing, for instance into feed. It is also possible to compost the manure, whether or not after fermentation, and to dry the fermented and/or mineralized solid manure stream and to subsequently burn it or, if desired after addition of glass and/or sand, glaze the manure, whereafter it can be dumped or be used otherwise. An alternative application can be the use as substrate for mushroom growing, if desired after suitable treatment to make the material useful therefor, such as mixing with moisture-regulating fibers (such as coir).

A particular embodiment of the invention consists in the mixing of the solid manure with glass powder and additives, such as water glass. From that mixture, granules are formed, which, after drying, are heated. The organic component of the manure is thereby combusted, and porous mineral granules are obtained which are free of bacteria and disease germs.

It is also possible for the manure to be burnt and for the ash residues, comprising inter alia phosphates and minerals, to be heated, together with glass and/or water glass and optionally other additives, to a temperature of at least 650° C., to form a porous glass matrix from which the minerals are slowly released over time.

The heat released upon the combustion in turn can be usefully employed, for instance as heating for the stable. The flue gases in turn can be cleaned through conventional techniques, for instance a rotary particle separator and the like.

Figure 2:
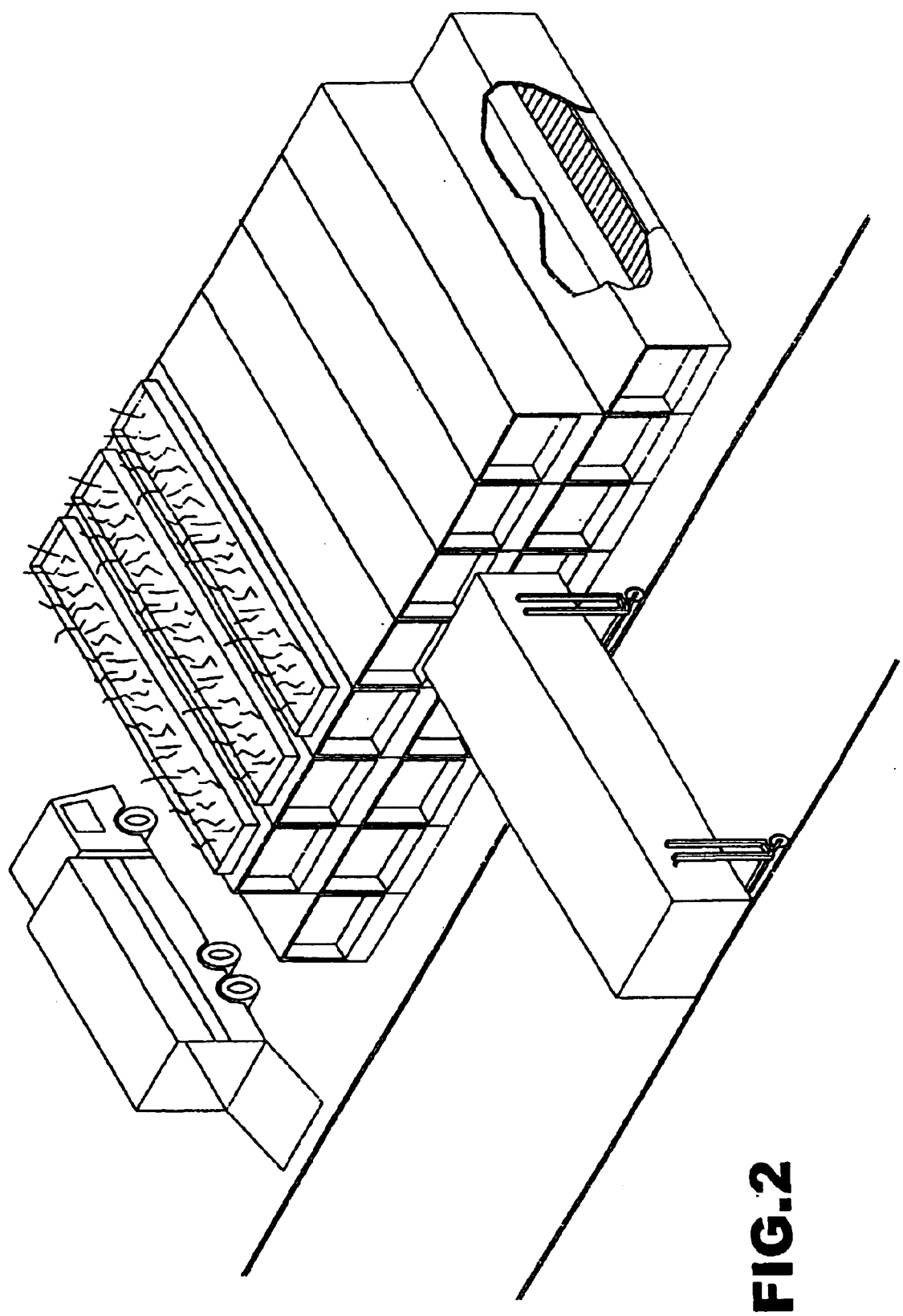
Figure 3:
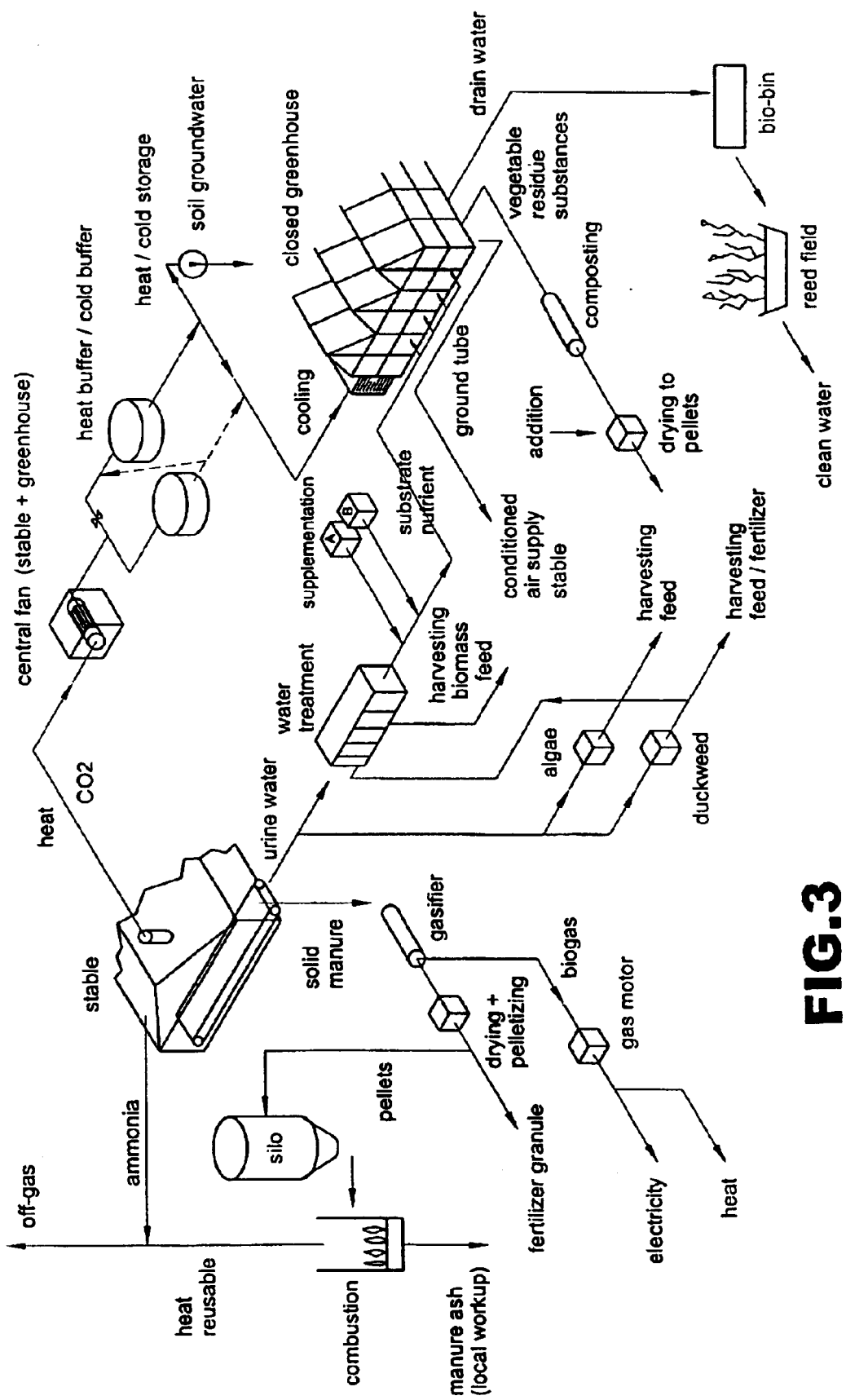

Referring to the accompanying drawings, the invention will presently be elucidated. In FIG. 1 an example is given of the current situation of a stable. FIG. 2 shows a new concept of a stable, whereby a number of modular boxlike housings have been combined. FIG. 3 gives a schematic overview of a number of possibilities for integrating the various product streams.

In FIG. 1 the current housing situation in a stable with manure production is represented. A stable is, so to say, an elongate boxlike space in which at floor level a number of compartmental partitions have been made. The animals stand behind these partitions, on grids. From above, hot or cooled air is introduced, which is discharged in the longitudinal direction along the grids.

The animals which are housed in the stable produce manure and urine which are collected in the collecting pit under the grids. According to the more modern systems, these products are rapidly discharged from the stable with flushing liquid to reduce ammonia emission.

In FIG. 2 a new implementation of a stable is shown, whereby a number of modular housings are combined with each other in the longitudinal direction, and which are also stackable. In these container-like housings, a manure removal system is placed, for instance a conveyor system.

In these modules, grid floors are placed along the entire width as well as along the entire length. This grid floor can be ridden out of the modules as a total unit including the animals housed on the grid. To that end, a second module is placed in front of the module to be emptied and it is fixedly positioned in front of the stationary module. By opening doors, the grid can subsequently be ridden from a stationary module and it can be displaced as desired to another module. As desired, either the entire grid or the animals are subsequently moved.

This concept also includes the possibility of using one or more modules in which mushroom growing is implemented based on residual substances from the system.

In FIG. 3 it is represented how the manure waste stream can be reused at the farm site. The embodiment to be eventually chosen depends on the specific choice of the techniques.

Figure 4:
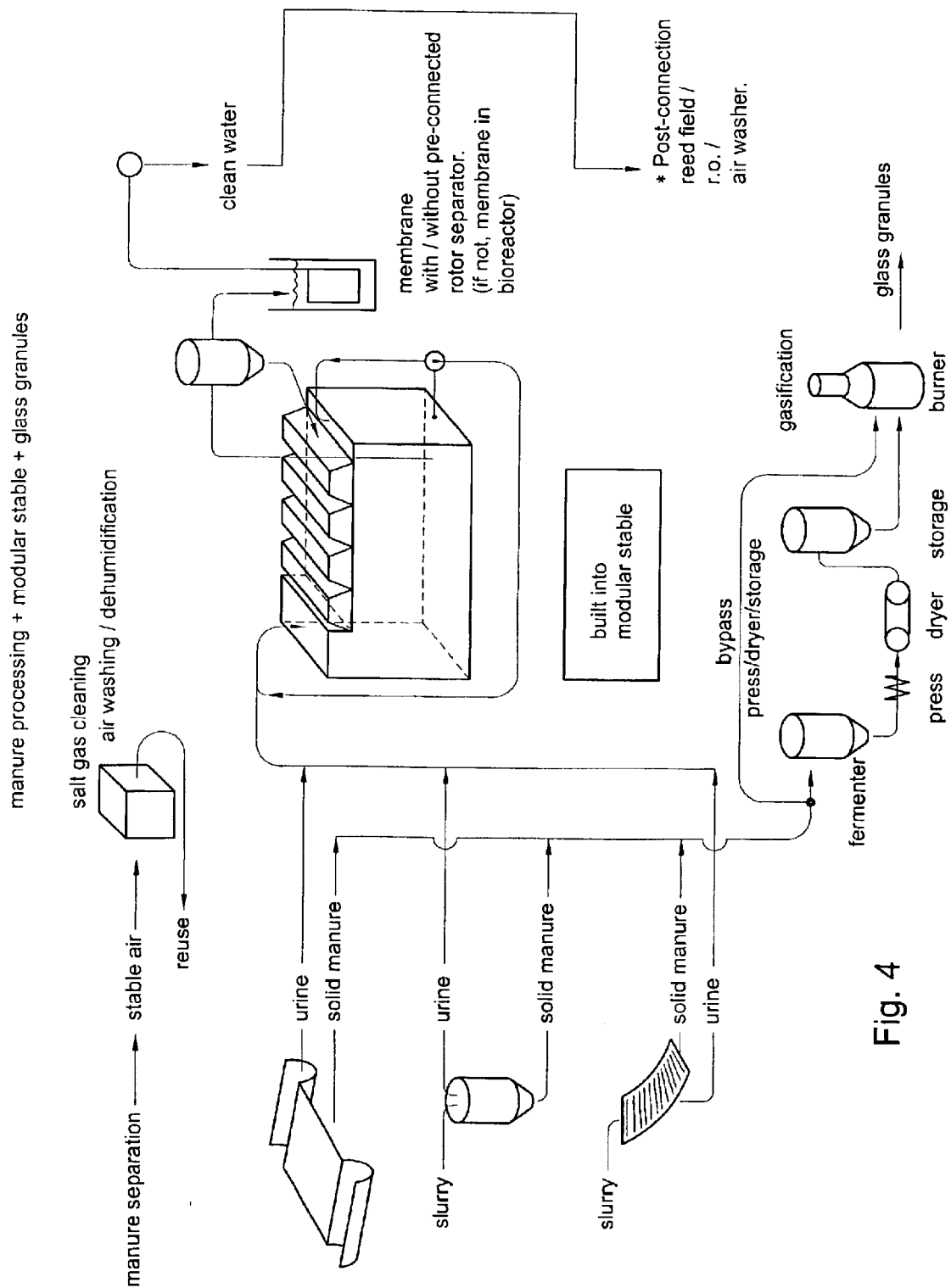

In FIG. 4 a number of aspects of the integrated systems according to the invention are schematically represented.

In the invention, the urine, is passed from the separation device to the aeration reactor (if desired after prior chemicophysical treatment). This reactor is built up from two compartments which are separated from each other by a partition, while an action of communicating vessels occurs. The water is introduced into the non-aerated zone and runs via a downward movement to the aerated compartment. The purified water is subsequently separated from the biomass via a membrane filter or rotary separator. The biomass is led back to the reactor and there divided between the aerated and non-aerated compartments.

After treatment of the waste water, the biomass can be harvested or be partly recirculated to the influent water stream, as desired. The choice depends on whether for the preparation of feed the biomass volume or the yield of the post-connected, technical components is harvested.

It has been found that in the water particular hydrocarbon compounds occur as well as salts and nitrates. This water is eminently suitable as nutrient medium for algae or for the purification of the flue gases of a combustion step. The algae are capable, in combination with photosynthesis, of binding nitrates to form proteins and converting the hydrocarbon compounds. Dried algae are an important food.

In the above-described systems, various nutrient components are released.

The solid manure from the separator contains a number of organic substances, which can be anaerobically converted to methane gas. From a compact fermenter, therefore, biogas can be produced, which can supply a combined heating and power station. The produced energy and heat quantities can be usefully employed at the farm. The composted or fermented and mineralized solid manure stream can presently, as desired, be combined with the biomass front the aeration reactor, as well as be combined with the cultivated algae, duckweed and/or other nitrogen-fixing organisms from the compact reactor.

Depending on the desired composition of the various components, an additive can be supplied, such as molasses, starch, brewer's grains, or similar additives, such that nutrient rich mass is produced, which at the same time provides for a drying. As a result, in a simple manner, through a small granule mincer, strands can be produced which can subsequently be further dried. Drying can take place through dry air, but there is also a possibility of passing the materials, by means of a conveyor screw, through a pipe in the water purification and thus to utilize the sensible heat of the waste water.

Investigation has shown that waste in the stable is not limited to manure streams, but that a considerable amount of $CO_2$ is produced by the animals in the stable in question. Thus, a pig weighing 100 kg will produce about 52.8 g of $CO_2$ per hour as well as an amount of heat.

The waste streams mentioned are responsible for a greenhouse effect in the environment.

By presently introducing the waste stream of the stables into reactors, both the heat quantity and the $CO_2$ quantity can be usefully spent, without deploying systems that cause greenhouse effects on two fronts. If desired, the heat can be converted to electricity, which can be usefully employed in the system.

The solid manure substances, as already indicated above, can be reused through another process, or be used as nutrient media and as garden mold, with the composted manure being mixed with coir fibers or other nutrient rich natural products. Coir fibers have a moisture-regulating action. Other types of fiber can also be used, as desired. It is also possible to utilize the glazed granules described herein in the system according to the invention.

What is claimed is:

1. A method for purifying waste water using microorganisms, which method comprises supplying waste water to a non-aerated section of a biological waste water purification plant, supplying the effluent of said non-aerated section to an aerated section, recirculating at least the greater part of the microorganisms and at least a part of the effluent of the aerated section to the the non-aerated section, and separating at least a part of the microorganisms using a membrane filtration.

2. A method according to claim 1, characterized in that, at least a greater part of the microorganisms and at least a part of the effluent of the aerated section is also recirculated to the aerated section.

3. A method according to claim 1, wherein the microorganism containing effluent is split by means of a membrane into a microorganism enriched stream to be largely re-circulated and a stream substantially free of microorganisms.

4. A method according to claim 1, wherein microorganism containing effluent of the aerated section is split into a microorganism enriched stream to be largely re-circulated and a stream reduced in microorganisms via a preseparator and membrane filtration.

5. A method according to claim 1, wherein at least a flat membrane is used, and behind the membrane a reduced pressure prevails.

6. A method according to claim 1, wherein at least a part of a biomass isolated during the process is used for washing contaminated air originating from a stable for intensive stock farming.

7. A method according to claim 1, wherein salt-containing purified waste water, after separation of a biomass and optional separation of other contaminants and/or concentration, is used for drying and/or decontamination of contaminated air originating from a stable for intensive stock farming.

8. A method according to claim 1, wherein salt-containing purified waste water, after separation of a biomass and optional separation of other contaminants and/or concentration, is electrolytically treated, thereby splitting the salt into acid and base.

9. A method according to claim 1, wherein heat originating from the waste-water purification is used for drying materials.

10. A method according to claim 1, wherein supplying the effluent of the non-aerated section to the aerated section comprises the flowing of the effluent of the non-aerated compartment of a reactor to an aerated compartment of the reactor via an action of communicating vessels.

11. A system according to claim 1, wherein the content of microorganisms in the waste-water purification is above 10 g/l.

12. A system for purifying waste water utilizing the method according to claim 1, comprising a biological waste water purification plant with a non-aerated section and an aerated section, means for re-circulating at least the greater part of the microorganisms and at least a part of the effluent of the aerated section to the non-aerated section, and means for separating at least a part of the effluent with the aid of a membrane filtration.

13. A system according to claim 12, further comprising means for also recirculating at least the greater part of the microorganisms and at least a part of the effluent of the aerated section to the aerated section.

14. A system according to claim 12, wherein the non-aerate section and the aerated section are each a compartment of a reactor which is arranged such that the reactor enable the waste water to flow from the non-aerated section to the aerated section via an action of communicating vessels.

15. A system according to claim 12, comprising at least a stable for keeping cattle, with means being present for substantially preventing the formation of ammonia through contact of solid manure and urine by separation into a solid and a liquid phase, which liquid phase is supplied to the non-aerated section of the waste-water purification plant, which system further comprises means for the at least partial reprocessing of the solid and/or the liquid phase into useful products.

16. A system according to claim 15, wherein said means for substantially preventing the formation of ammonia consist of a separation system for separating solid components and liquid components, which separation system is arranged under the compartment for the cattle or outside the stable.

17. A system according to claim 16, wherein said separation system consists of a plastic conveyer belt, whose central axis is higher than at least one of the sides, so that the liquid runs off laterally, while further a collection drain is present for collecting and discharging the liquid.

18. A system according to claim 16, wherein the means consist of a rotor separator, a screening band, or a screw separator.

19. A system according to claim 12, wherein the waste-water purification one or more tubes are arranged through which the material to be dried can be conveyed, which material is dried by heat exchange with the hot waste water.

20. A system according to claim 12, wherein the solid phase is further processed by fermentation and/or combustion and/or gasification, optionally combined with rendering the residue products inert by glazing/glass foaming.

21. A system according to claim 12, wherein one or more product streams, such as algae, duckweed, biomass and/or solid composted manure optionally in combination with other components, are used as feed.

22. A system according to claim 21, wherein solid manure components, whether or not after pre-treatment (fermenting, composting, mineralizing), are mixed with glass powder and optionally other additives, which mixture is subsequently converted into porous glass granules.

23. A system according to claim 12, wherein the stable is implemented as a conventional system or a modular system of boxlike modules with mobile receiving module.

* * * * *